UNITED STATES PATENT OFFICE.

WALTER H. STEARNS, JR., OF NEWTON, MASSACHUSETTS.

ARTIFICIAL STONE OR MARBLE.

SPECIFICATION forming part of Letters Patent No. 321,459, dated July 7, 1885.

Application filed October 13, 1884. Renewed May 22, 1885. (No specimens.)

*To all whom it may concern:*

Be it known that I, WALTER H. STEARNS, Jr., of Newton, county of Middlesex, State of Massachusetts, have invented an Improvement in Artificial Stone or Marble, of which the following description is a specification.

My invention has for its object to produce an artificial stone or marble which is substantially fire and water proof and which may be made into blocks for building purposes, or may be applied superficially in the form of a paint to produce a stone surface of any desired color.

The invention consists, essentially, in a cementitious liquid compound which, when mingled with a suitable base of stony material, hardens or sets, forming a stony substance which may be made to have any desired color by incorporating therewith suitable coloring materials. Such a compound, when properly colored, may be applied in a fluid state to the surfaces of buildings after the manner of paint; or when desired to make artificial stone the said liquid compound is used in connection with fragments or small pieces of stony material—such as sand or gravel—which, when mixed with the said compound, may be formed in molds and permitted to set, when the mass will have the character of a natural stone.

The cementitious compound employed in carrying out my invention consists, essentially, of acetic acid or strong vinegar—about two gallons—in which is preferably dissolved three pounds of terra-japonica, (although for some purposes the terra-japonica is omitted,) and to this liquid or solution is added six pounds of manganese borate, six pounds carbonate of ammonia, one pound Glauber's salt or sulphate of soda, two pounds balsam, preferably Canada or fir balsam. If there is not sufficient of the acid to dissolve the other ingredients more may be added until all are dissolved. The solution or compound thus made should be kept in a closed or air-tight vessel until used.

For making artificial stone, I take six parts of pure sharp sand and gravel free from loam, and add one part of Portland cement, thoroughly mixing these materials in a dry state. I then take one quart of the liquid compound just dissolved and dilute the same in ten gallons of water, dampen the mixture of sand and cement therewith, stirring the same thoroughly, so that every particle of the sand or solid matter is touched by the solution. This mixture is then placed in molds and tamped or solidified therein in the usual manner. The fineness of the sand or gravel employed will be chosen with reference to the quality or grain of the stone it is desired to produce, and the same may be colored, as desired, by the addition of any usual pigment or coloring material. When the material is set or sufficiently dry and firm to be handled, which is usually the case in about twenty-four hours, it may be placed on a bed of sand to thoroughly dry and harden, the block or mass being sunk into the sand for some depth, and if it appears to dry unevenly it may be dampened or coated with the solution, it being preferably kept well saturated with the solution for about two days, after which it is permitted to dry in the open air for a day or more, when it will become water and fire proof.

In making a stone surface or pavement for sidewalks, the lower portion to the depth of one to three inches may be made of large-sized pebbles or broken stone or brick having the interstices filled in with small pebbles or sand. Then a mixture of about eight parts of gravel and one of cement, moistened with the solution, is spread over the bed of broken stone to the depth of about one inch and tamped or solidified thereon. The top of this mass, after having set, is scraped or roughened to cause another coat to adhere to it, and such superficial coat preferably consists of two parts of fine sharp silicious sand and one part of cement, mixed to about the consistency of cream with the liquid compound. This is applied to the depth of from one-half to three-quarters of an inch, and preferably leveled and smoothed with a trowel or other suitable instrument. Then the stone thus formed is moistened two or three times a day with the solution, being thus impregnated throughout.

For artificial marble the solution is the same, except that what is known commercially as "white acid vinegar" is preferably employed as the acid, and the terra-japonica is omitted, and instead of using Portland cement in the material I use pulverized gypsum or plaster-of-paris.

For producing the various colored marbles, the various coloring materials—such as chrome yellow, the different shades of ochers, raw and burnt umber, raw and burnt sienna, and others—may be employed, these colors being separately dissolved in the first-described solution, and then mingled in their proper proportions with the gypsum or plaster-of-paris. Then, by the proper distribution of the various different-colored material it is possible to imitate any of the natural marbles.

The artificial marble thus produced may be polished and finished in the usual manner.

When it is desired to apply an artificial stone surface to material, I take four parts of Portland cement and one part of fine sand mixed with the solution to the consistency of paint, and provided with any desired coloring-matter. This mixture may be applied on the surface of the artificial stone made as described or upon other material in the form of paint.

I claim—

1. The herein-described liquid cementitious compound consisting of acetic acid, manganese borate, carbonate of ammonia, Glauber's salt, and balsam, in substantially the proportions specified.

2. The herein-described compound for artificial stone, consisting of sand or fragmentary stone material and Portland cement united by a cementitious compound consisting of acetic acid, terra-japonica, manganese borate, carbonate of ammmonia, Glauber's salt, and balsam, in substantially the proportions specified.

In testimony whereof I have signed my name to this specification in the presence of two subscribing witnesses.

WALTER H. STEARNS, JR.

Witnesses:
  JOS. P. LIVERMORE,
  W. H. SIGSTON.